(No Model.)
H. B. ANGELL.
DREDGER.
No. 369,976. Patented Sept. 13, 1887.
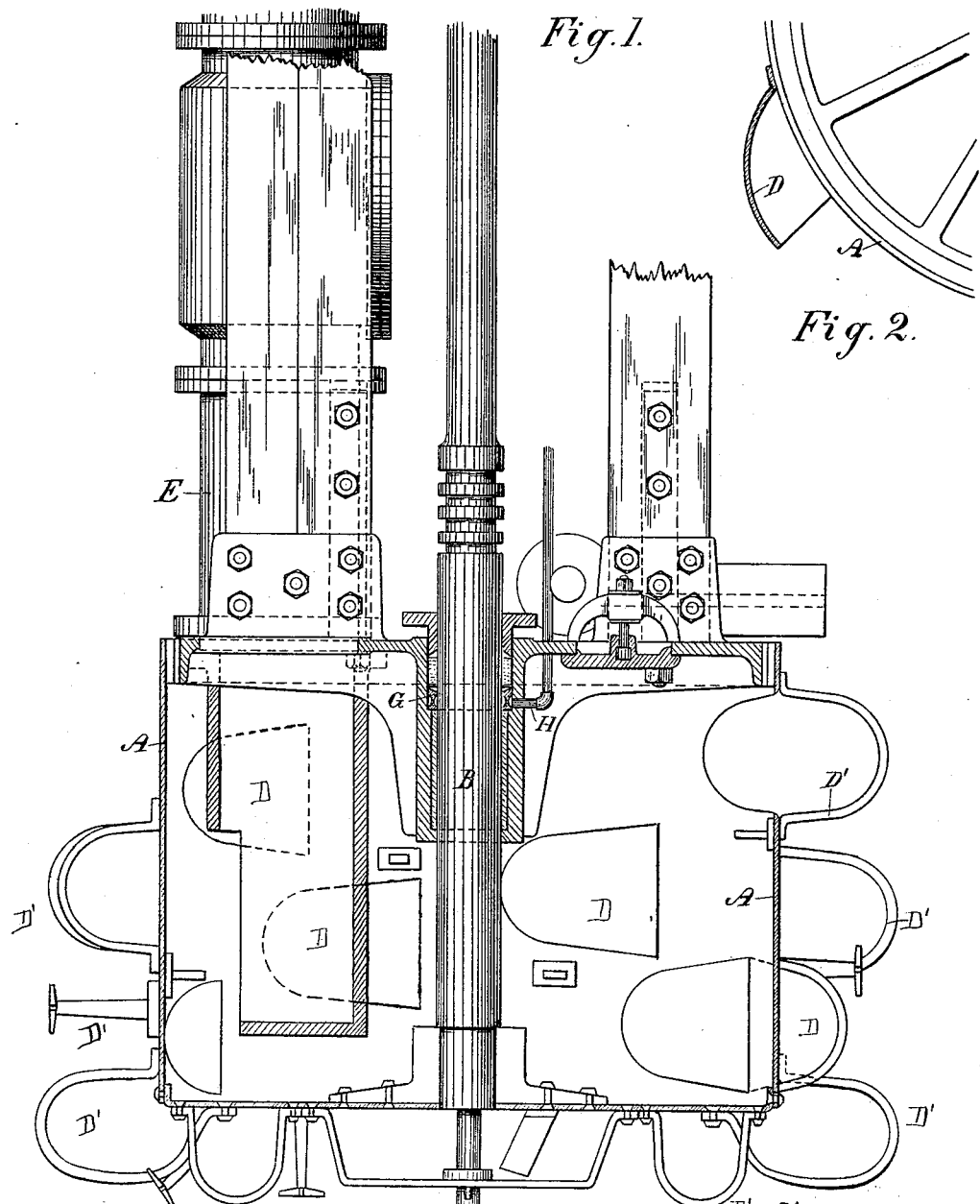
Witnesses,
Geo. H. Strong.
G. H. Strouse
Inventor,
H. B. Angell
By
Dewey & Co.
Attorneys

UNITED STATES PATENT OFFICE.

HORACE B. ANGELL, OF SAN FRANCISCO, CALIFORNIA.

DREDGER.

SPECIFICATION forming part of Letters Patent No. 369,976, dated September 13, 1887.

Application filed May 22, 1885. Serial No. 166,397. (No model.)

*To all whom it may concern:*

Be it known that I, HORACE B. ANGELL, of the city and county of San Francisco, State of California, have invented an Improvement in Dredgers; and I hereby declare the following to be a full, clear, and exact description of the same.

My invention relates to certain improvements in dredgers of that class in which a cylinder armed with buckets or diggers is caused to rotate at the lower end of a driving-shaft, so that the diggers will deliver the material to its interior, from which it is drawn out by a suction-pump and pipe.

My invention consists in a means for breaking up hard materials and protecting the cylinder, buckets, and other parts which are exposed to the attrition of the material from wear, as will be more fully explained by reference to the accompanying drawings, in which—

Figure 1 is a view of the excavating-cylinder, the driving-shaft, and a part of the suction-pipe. Fig. 2 is a section of part of the cylinder and one bucket.

A is a cylinder, of considerable size, made of strong plate metal, having a shaft, B, extending through its center, and serving as a journal upon which the cylinder turns, being driven by suitable gearing and engines mounted upon a supporting-frame. The sides of this cylinder have holes or openings made in them at various points, and buckets or scoops D are fixed upon the exterior of the cylinder above these openings, so that as the cylinder revolves, the buckets will dig up the earth or material and discharge it through the openings to the interior of the cylinder, from whence it is conveyed away by a suction-pipe, E, one end of which opens into the interior of the cylinder, while the opposite end extends to the suction-pump, by which the material is removed from the cylinder as rapidly as it is supplied.

The wear upon the cylinder and buckets in hard material is very considerable on account of the attrition of the particles of material through which the apparatus works; and in order to protect the cylinder and buckets, and to more easily cut the material, I employ strong loops, plows, or cutters of steel or iron, D', which are bolted or riveted to the cylinder at various points around its circumference and upon the angles or lower or forward end, so as to project beyond the line of the buckets, and thus receive the wear occasioned by the rotation of the cylinder in contact with the earth or material which is being excavated. These protectors are preferably made of considerable width of strong bar steel or iron, and have flanges bent so that they may be riveted or bolted to the cylinder, as shown. The edges will be sufficiently sharpened to act as cutters, and thus loosen the earth, so that when the body of the cylinder and the buckets pass through it the material will readily discharge to the interior of the cylinder, which is thus protected from a great amount of wear. These protecting shoes or cutters will be worn out in a very short time when working in hard material; but they are comparatively inexpensive and can be easily replaced when worn, and the more expensive cylinder and buckets will be preserved. In order to prevent the earth or material which is being excavated and stirred up from entering the bearing at G, through which the central driving-shaft passes and turns, a ring, G, is fitted inside of the stuffing-box and the shaft. This ring has its outside and inside faces concave and openings through it to allow water to pass. A stream of water is delivered into it under pressure through the pipe H, and this prevents the material from working its way into the joint.

I am aware that it is not new to provide the surface of a revolving dredging-cylinder having buckets with diggers on its periphery, and I do not, therefore, broadly claim this. Neither do I claim plain fin-shaped cutters arranged upon the periphery and extending at right angles to the entrance of the buckets, said cutters being adapted to give a knife-like cut in operation.

I am also aware that a hydraulic bearing for a rotating shaft has been provided by means of water-ducts passing through the case in which the shaft rotates, and I do not claim this; but What I do claim is this—

1. In a dredging-machine, a cylinder having buckets upon its periphery, means for protecting said cylinder and buckets, consisting of a series of loops, plows, or cutters secured to the said cylinder, said devices consisting of a suitable supporting standard or standards with their outer or cutting edges arranged at approximately right angles to the said standard or standards and adapted to cut and disintegrate the material with which they come in contact, substantially as described.

2. In a dredging-machine, a cylinder having buckets upon its periphery, means for protecting the said cylinder and buckets, consisting of a series of loops, plows, or cutters secured to the said cylinder, projecting beyond the line of the buckets, combined with a series of loops, plows, or cutters projecting from the bottom of the cylinder, whereby both the periphery and bottom of the cylinder are protected, substantially as described.

3. The chamber or stuffing-box surrounding the bearing or shaft, in combination with a ring fitted into the chamber, having its outside and inside grooved or made concave, with openings made through it, and an inlet opening or pipe opposite the grooved ring, substantially as herein described.

In witness whereof I have hereunto set my hand.

HORACE B. ANGELL.

Witnesses:
WM. S. CAMPBELL,
S. H. NOURSE.